(No Model.)

2 Sheets—Sheet 1.

E. MAERTENS.
MECHANICAL MOVEMENT.

No. 309,722.  Patented Dec. 23, 1884.

Witnesses:
John M. Clayton
Harry Drury

Inventor:
Emile Maertens
by his Attorneys
Hiram & Sons (No Model.) 2 Sheets—Sheet 2.

E. MAERTENS.
MECHANICAL MOVEMENT.

No. 309,722. Patented Dec. 23, 1884.

Witnesses:
John M. Clayton.
Harry Drury

Inventor:
Emile Maertens
by his Attorneys
Howson & Sons

UNITED STATES PATENT OFFICE.

EMILE MAERTENS, OF OSWEGO FALLS, NEW YORK.

MECHANICAL MOVEMENT.

SPECIFICATION forming part of Letters Patent No. 309,722, dated December 23, 1884.

Application filed September 29, 1884. (No model.)

*To all whom it may concern:*

Be it known that I, EMILE MAERTENS, a citizen of the United States, and a resident of Oswego Falls, Oswego county, New York, have invented a certain new Mechanical Movement, of which the following is a specification.

My invention consists of a device, described and claimed hereinafter, for converting a uniformly rotating motion into a differential rotating motion.

Figures 1, 5, 6:
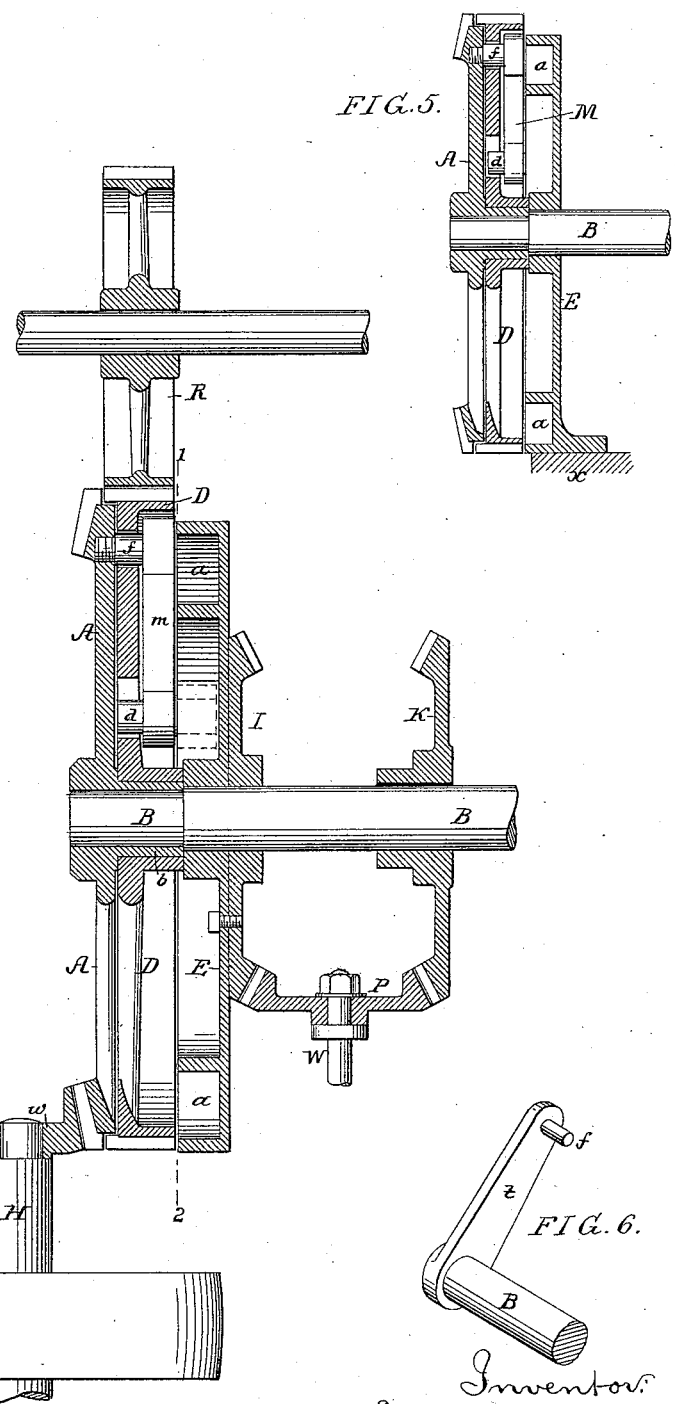
Figure 2:
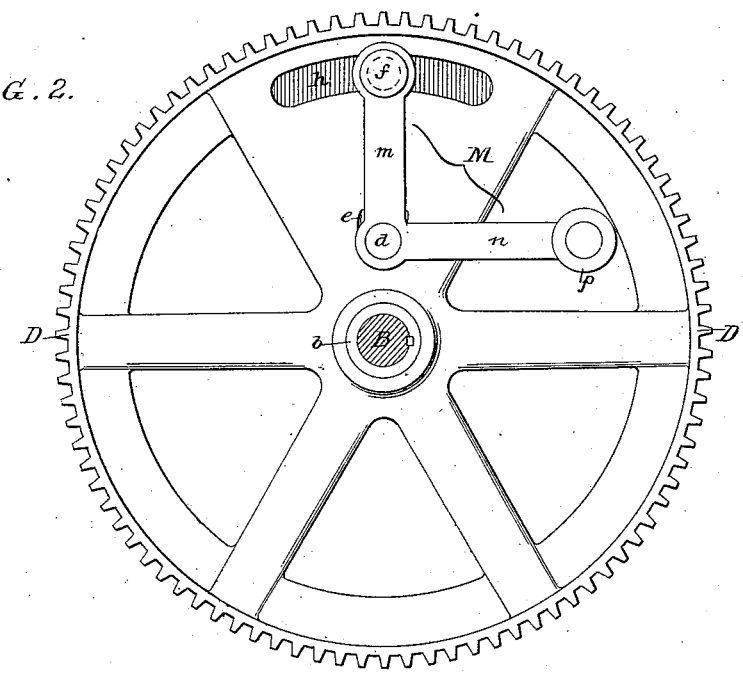
Figure 3:
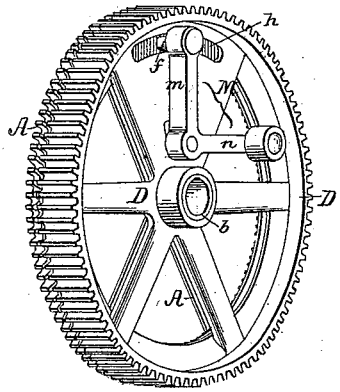
Figure 4:
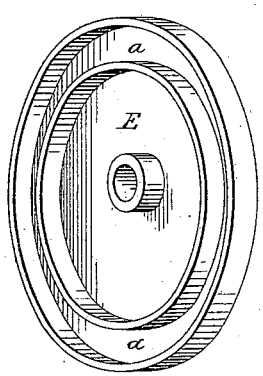

In the accompanying drawings, Figure 1, Sheet 1, is a view, mainly in section, of mechanism in which my invention is embodied; Fig. 2, Sheet 2, a section on the line 1 2, Fig. 1; Figs. 3 and 4, perspective views drawn to a reduced scale, and showing detached views of the device; Fig. 5, a sectional view introduced for the purpose of explaining my invention, but not embodying the same; and Fig. 6, a perspective view illustrating a modification of my invention.

Referring in the first instance to Figs. 1, 2, 3, and 4, A is a wheel secured to the shaft B, which, with the wheel, is driven at a uniform speed, and a second wheel, D, is loose on the shaft B, or on the hub *b* of the said wheel A.

A wheel, disk, or plate, E, which I will term an "eccentric," has a groove, *a*, which is annular in the present instance, and which is eccentric in respect to the axis of the shaft B.

A lever, M, having two arms, *m* and *n*, has a pin, *d*, which extends into an opening, *e*, in the wheel D, this opening being elongated, as the pin must have some play in the wheel, for a reason rendered apparent hereinafter. The arm *m* of the lever M is connected to a stud, *f*, which passes through a segmental opening, *h*, in the wheel D, and is secured to the wheel A; and the arm *n* of the lever is provided with an anti-friction roller, P, which enters the groove *a* of the eccentric E.

The desired differential movement of the wheel D is brought about by the combination of the above parts in a manner which can be best described in connection with Figs. 2 and 5. In the latter figure I have supposed the eccentric E to be secured to a fixed object, *x*, in which the shaft is at liberty to revolve. As the wheel A rotates, the lever M must be carried round with the wheel. If the annular groove *a* should be concentric with the axis of the shaft, the wheel D would turn in unison with and at the same uniform speed as the wheel A, for the two wheels are connected together by the lever M, and there is nothing in the condition of the groove *a* to induce any independent movement of the lever. If, however, the groove be eccentric in respect to the axis of the shaft, (and this must always be the case in carrying out my invention,) the eccentric must exert an influence on the wheel through the medium of the lever M. In other words, the wheel D may be said to have two movements, the source of one being the wheel A, which tends to turn the wheel D at a uniform speed, and the source of the other being the eccentric, which so neutralizes this tendency as to compel the wheel D to rotate differentially; but the two movements are so absorbed, one by the other, that the two become one continuous differential rotating motion.

It should be here understood that I do not claim the device in connection with a fixed eccentric, the arrangement shown in Fig. 5 having been illustrated and described for the purpose of better explaining my invention, which has much greater capacity for variation of differential movements than can be attained by the fixed eccentric.

In Fig. 1 (which illustrates the complete device made according to my invention) the eccentric E is loose on the shaft and rotated in a direction contrary to that in which the driver rotates, this being brought about in the present case by the bevel-wheel K, fast to the shaft B and gearing into a bevel-wheel, P, carried by a shaft, W, the latter wheel gearing into a bevel-wheel, I, secured to the eccentric.

The character of the differential motion of the wheel may be varied almost indefinitely. It may be varied, for instance, by changing the speed of the eccentric, or the eccentric may be converted into a cam, the groove *a* being scroll-shaped, and cams with differentially-arranged swells and depressions may be employed to change the character of the differential movement.

While it is essential to my invention that a movement should be imparted to the eccentric, both the character of the latter and that of its movement will depend upon the desired differential movement of the wheel D.

It is not essential that the eccentric should be rotated. It may, for instance, be vibrated, and it is immaterial, moreover, what kind of gearing or other appliances may be used to actuate the eccentric.

The mechanism shown in Fig. 1 has been devised for the purpose of applying my invention to a loom, A being in this case a bevel-wheel, into which gears a pinion, $w$, on the driving-shaft H of the loom, and the wheel D gearing into a pinion, R, on the shaft of the loom, from cranks on which shaft the latter is operated.

The eccentricity of the groove $a$ is such and the eccentric is so driven that the lathe, instead of having a uniform vibrating movement, will have a differential vibratory motion of such a character that ample time will be afforded for throwing a shuttle across the lathe-bed of a loom, and for permitting the drop-boxes and harness to be properly operated, the weft-thread, moreover, being beaten up under an increased speed of the lathe, thus making it possible for a larger number of picks to the inch to be driven into the cloth than by ordinary looms. It will be understood, however, that my invention admits of application to any machines in which differential rotating motions have to be imparted.

A driven wheel, A, need not be used in all cases. The shaft B itself may be the driver, and may be furnished with an arm or carrier, $t$, to which is attached the stud $f$, connected to the arm $m$ of the lever M, as shown in Fig. 6.

If the eccentric is rotated, it must either be driven in a direction contrary to that of the driver A, or must be rotated at a speed differing from that of the driver.

As regards the lever M, it may be varied in construction without departing from my invention, and equivalents of the lever will readily suggest themselves to expert mechanics.

I claim as my invention—

1. The combination of a shaft, B, a carrier, A, thereon, a wheel, D, an eccentric, E, and mechanism for actuating the same, with an attachment by which the said eccentric is caused to determine the differential motion of the said wheel, substantially as set forth.

2. The combination of the driver, the shaft B, the wheel or carrier A, the wheel D, loose on the shaft, the eccentric E, also loose on the shaft, and the lever M, with gearing, substantially as described, for rotating the eccentric in a direction contrary to that of the wheel, all substantially as described.

In testimony whereof I have signed my name to this specification in the presence of two subscribing witnesses.

EMILE MAERTENS.

Witnesses:
JOHN M. CLAYTON,
HARRY SMITH.